(12) United States Patent
Wynman

(10) Patent No.: US 8,434,115 B1
(45) Date of Patent: Apr. 30, 2013

(54) MULTI-COMPONENT ONT POWER SUPPLY

(75) Inventor: Stanley Jo Wynman, Bogota, NJ (US)

(73) Assignee: Verizon Services Corp., Ashburn, VA (US)

( * ) Notice: Subject to any disclaimer, the term of this patent is extended or adjusted under 35 U.S.C. 154(b) by 857 days.

(21) Appl. No.: 11/144,566

(22) Filed: Jun. 3, 2005

Related U.S. Application Data

(60) Provisional application No. 60/576,675, filed on Jun. 3, 2004.

(51) Int. Cl.
*H04N 7/18* (2006.01)
*H04N 7/173* (2011.01)

(52) U.S. Cl.
USPC .............................. 725/74; 725/80; 725/127

(58) Field of Classification Search ............. 725/74, 725/80, 127
See application file for complete search history.

(56) References Cited

U.S. PATENT DOCUMENTS

| | | | |
|---|---|---|---|
| 5,615,246 A * | 3/1997 | Beveridge | 379/56.2 |
| 6,026,000 A * | 2/2000 | Buijs et al. | 363/21.06 |
| 6,240,337 B1 * | 5/2001 | Marr et al. | 700/286 |
| 7,113,679 B2 * | 9/2006 | Melton et al. | 385/113 |
| 7,133,441 B1 * | 11/2006 | Barlev et al. | 375/222 |
| 2003/0066082 A1 * | 4/2003 | Kliger et al. | 725/80 |
| 2004/0004538 A1 * | 1/2004 | Manis et al. | 340/310.01 |
| 2006/0274734 A1 * | 12/2006 | DeMartino | 370/352 |

* cited by examiner

*Primary Examiner* — Pankaj Kumar
*Assistant Examiner* — Franklin Andramuno

(57) ABSTRACT

An optical network terminal (ONT) is powered via a remote power supply. The remote power supply is connected to a standard customer premises electrical power outlet, providing a power source for power at a first format (e.g., 110 VAC). The remote power supply performs a power transformation to convert the power in the first power format to a second format (e.g., 48 VDC). This allows the powering of the ONT from farther distances, and thus allows for the easier installation of ONTs at customer premises which may not have optimally placed power outlets. A battery backup may also be used (either in parallel or serially), in order to provide availability of communications signals during a public power outage. When the battery backup used serially with the remote power supply, additional distance between the power outlet and the ONT may be accommodated.

16 Claims, 3 Drawing Sheets

MULTI-COMPONENT ONT POWER SUPPLY

CROSS-REFERENCE TO RELATED APPLICATIONS

This claims the benefit of prior co-pending U.S. provisional patent application Ser. No. 60/576,675, filed Jun. 3, 2004.

BACKGROUND

As part of a deployment of fiber to the premises (FTTP) networking to individual customer premises (for example, residential homes), an "optical network terminal" unit (ONT) needs to be installed at each customer premises. The ONT provides the interface between the customer premises communications equipment (telephone, data, video STB and TVs) and the fiber network. Current ONTs, particularly those used with FTTP networks that are passive optical networks (PONs), require their own power supplies, as the fiber network does not supply power to the customer premises. Current implementations of the ONT may include a power connection to standard customer premises power supply (e.g., 110 VAC) via a cable configured to be usable with standard power outlets.

One concern raised by ONTs is that a power outage at the customer premises may prevent access to telephone communications over the fiber network via the ONT. In order to address these concerns, current ONT implementations specify the use of a uninterruptible power supply (UPS)—such as a backup battery—to power the ONT, such that the UPS provides power to the ONT upon power failure. The current specification for ONT UPSs requires that the UPS provide enough power to allow the ONT to provide up to eight hours of telephone services to the customer. The UPS is typically deployed with the ONT, such that the ONT draws its power from the UPS or from the customer premises power supply. The UPS is typically deployed separately from the ONT, allowing it to be independently maintained and placed in environmentally friendly locations (e.g., in the interior of the customer premises). This requires power supply cabling between the ONT and the UPS.

Power supply cabling is governed by both physical laws (e.g., Ohm's law) and legal regulations. For example, the cabling between the ONT and the customer premises power outlet is typically eight feet in length or shorter in order to comply with electrical and building codes. The cabling between the UPS and the ONT is ideally less than 50 feet in length in order to reduce resistive losses. Additionally, the location of the customer premises power source (e.g., a power outlet) must comply with applicable building codes regarding power wiring, which may limit outlet placement. With these restrictions, the installation costs associated with installing an ONT can be significant, as additional electrical installations may be required to accommodate the ONT.

Investigating various building constructions and home layouts, it was determined that at least 10% of a sampling of homes would not have a power outlet within the placement constraints of existing power supply cabling. In those cases, an electrical contractor would need to be dispatched and required to install an electrical outlet in an area that was acceptable to the customer and within the design constraints of the UPS/ONT, at a significant expense and delay.

DETAILED DESCRIPTION OF PREFERRED EMBODIMENTS

To provide additional range for placement of an ONT unit relative to one or more power sources, an additional power supply is introduced between the ONT and a customer premises power source. This additional power supply may convert standard premises power forms (e.g., 110 VAC) to another power form (e.g., 48 VDC power), which allows for sufficient powering of the ONT unit from greater remote distances. Furthermore, as the power requirements are reduced, the cabling between the additional power supply and the ONT unit can use lower gauge wiring, such as typical 24 gauge Cat 3 or Cat 5e cabling, which can be more easily installed (or may already be installed). This combination provides greater installation versatility and reduces the need for additional electrical installations. For example, efficiencies can be realized when the Cat 5e cables placed by the technician for data communications could also be utilized to carry the power to the ONT. A spare pair of existing Cat 3 telephone cable could also be utilized as an alternative. As further described below, the additional power supply can alternatively be connected to a battery backup system which is connected to the ONT unit. This allows even further distances between the customer premises power outlet and the ONT to be accommodated.

Figure 1:
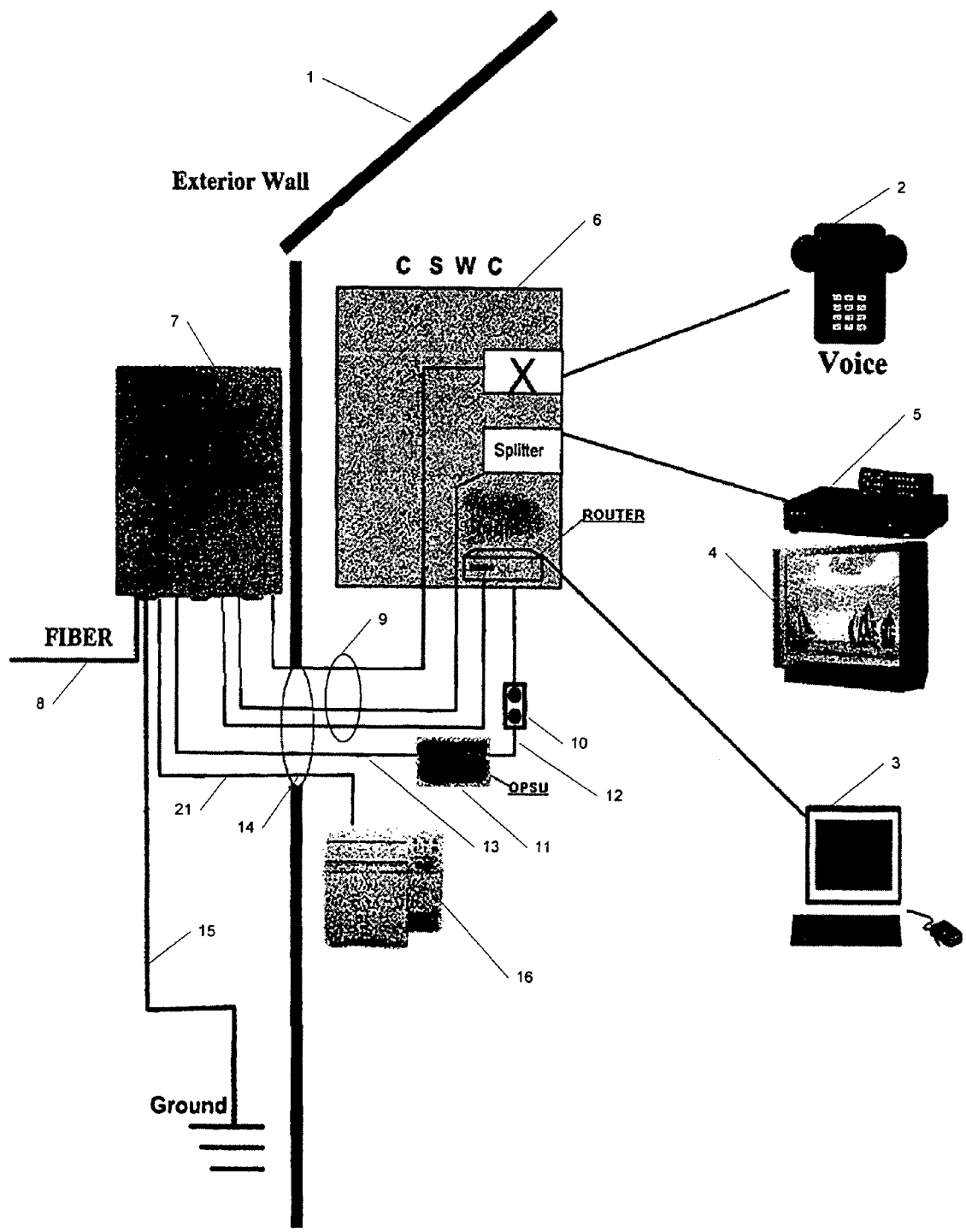
FIG. 1 illustrates an implementation of an ONT powering system, according to the present invention.

FIG. 1 illustrates a deployment according to a first preferred embodiment. Customer premises 1 may include various customer premises communications equipment—a telephone 2, a computing device 3, a television 4 and a set-top box 5. Customer premises 1 may also include a centralized structured wiring cabinet (CSWC) 6 to which cabling to customer premises communications equipment may be terminated. As shown in FIG. 1, the CSWC 6 may be sited inside customer premises 1, and may include facilities to provide signals over the terminated cabling (for example, splitters, switches, routers, etc.).

Also shown in FIG. 1 is an ONT unit 7 which, as shown, may be located exterior to customer premises 1 (e.g., mounted to an exterior wall of customer premises 1). ONT unit 7 may be connected to a fiber cable 8 that provides connection to the FTTP network. The ONT unit 7 may be connected to the CSWC 6 via various cables 9—for example, Cat 5e cabling for voice and data communications, and RG6 coaxial cabling for video signals. Cables 9 may be deployed through a conduit 14 that allows cables 9 to pass from the interior of customer premises 1 to the exterior, thus allowing connection to ONT unit 7. ONT unit 7 may be grounded via a grounding connection 15. ONT unit 7 may be powered via cable 13 or cable 21, as further described below.

Figure 2:
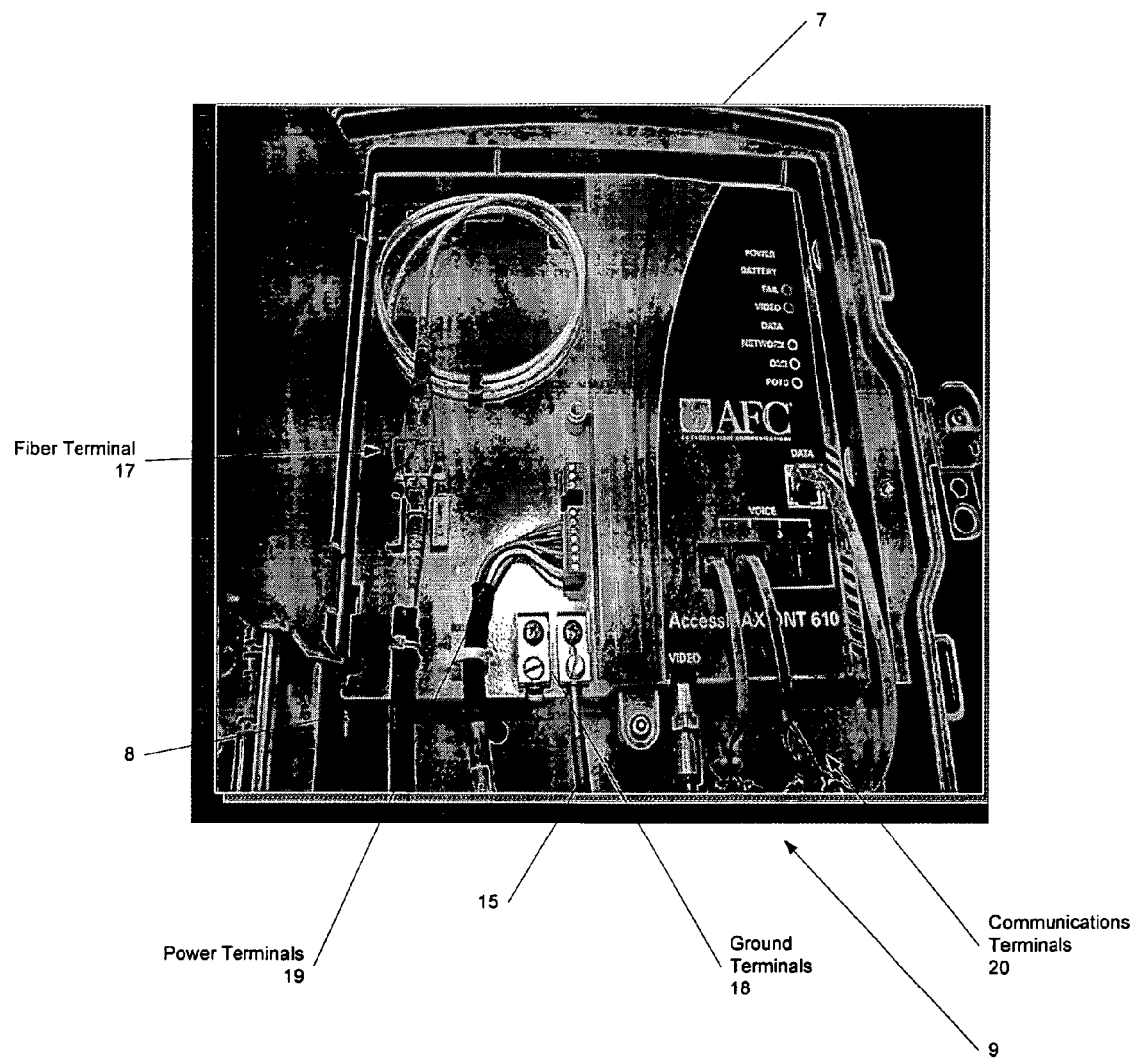
FIG. 2 illustrates an exemplary ONT unit, according to the present invention.

FIG. 2 illustrates an example of an ONT unit 7. Exemplary ONT unit 7 includes a fiber terminal 17 which allows fiber cable 8 to communicate with ONT unit 7. ONT unit 7 also includes one or more grounding terminals 18 to electrically connect the ONT to grounding connection 15. ONT unit 7 also includes one or more power terminals 19 to electrically connect the ONT unit 7 to cable 13 and/or cable 21 for power sourcing. ONT unit 7 also includes communications terminals 20 to connect ONT unit 7 to cables 9 to provide/receive communications signals (e.g., telephone, data, video signals). The power terminals 19 may include one or more battery backup terminals to provide backup power, charge a backup battery, and provide diagnostic signals (e.g., charge level) via a cable 21, as further described below. ONT unit 7 may include facilities to detect when a loss of power occurs in order to draw power from battery backup. Other implementations of ONT unit 7 are also possible, as known in the art.

Referring again to FIG. 1, customer premises 1 will include a power outlet 10, for example a standard 3-prong 110 VAC outlet. As shown, power outlet 10 is sited within customer premises 1. For purposes of the current example of implementation, the power outlet 10 is located more than 10 feet (for wiring purposes) from the ONT 7.

Further provided in FIG. 1 is an optical power supply unit (OPSU) 11. OPSU 11 is connected to power outlet 10 via a standard power cable 12, consistent with electrical codes (for example, which may require cable 12 to be eight feet or less in length). OPSU 11 may provide a power transformation facility to convert the 110 VAC power provided from power outlet 10 to, for example, 48 VDC power which can be used to power ONT unit 7. OPSU 11 is connected to the ONT unit 7 via cable 13. Cable 13 may utilize small gauge wiring such as 24 AWG wiring as used in Cat 5e cables. Cable 13 may be as long as 100 feet, and deployed through the same conduit 14 as cables 9.

A battery backup unit (BBU) 16 is also shown in FIG. 1. BBU 16 provides an uninterruptible power source to ONT unit 7, and may comprise a battery storing charge to supply sufficient power for minimal operation of ONT unit 7 for a certain period of time when ONT unit 7 loses power from OPSU 11. BBU 16 may be connected to the ONT unit 7 via a cable 21, which in this example may be bi-directional; ONT unit 7 may provide power to BBU 16 over cable 21 in order to charge BBU 16 while ONT unit 7 is being provided with power, and BBU 16 may provide power to ONT unit 7 over cable 21 when ONT unit 7 is no longer receiving power. Cable 21 may include wiring to provide diagnostic signals between BBU 16 and ONT unit 7 (e.g., charge levels).

As FIG. 1 illustrates, the use of OPSU 11 allows the power outlet 10 to be placed more than ten feet from the ONT unit 7—in this example, anywhere up to 100 feet from the
ONT unit 7, as OPSU 11 can provide ONT unit 7 with sufficient power over small gauge power cabling (such as 24 AWG wire) over longer distances.

Figure 3:
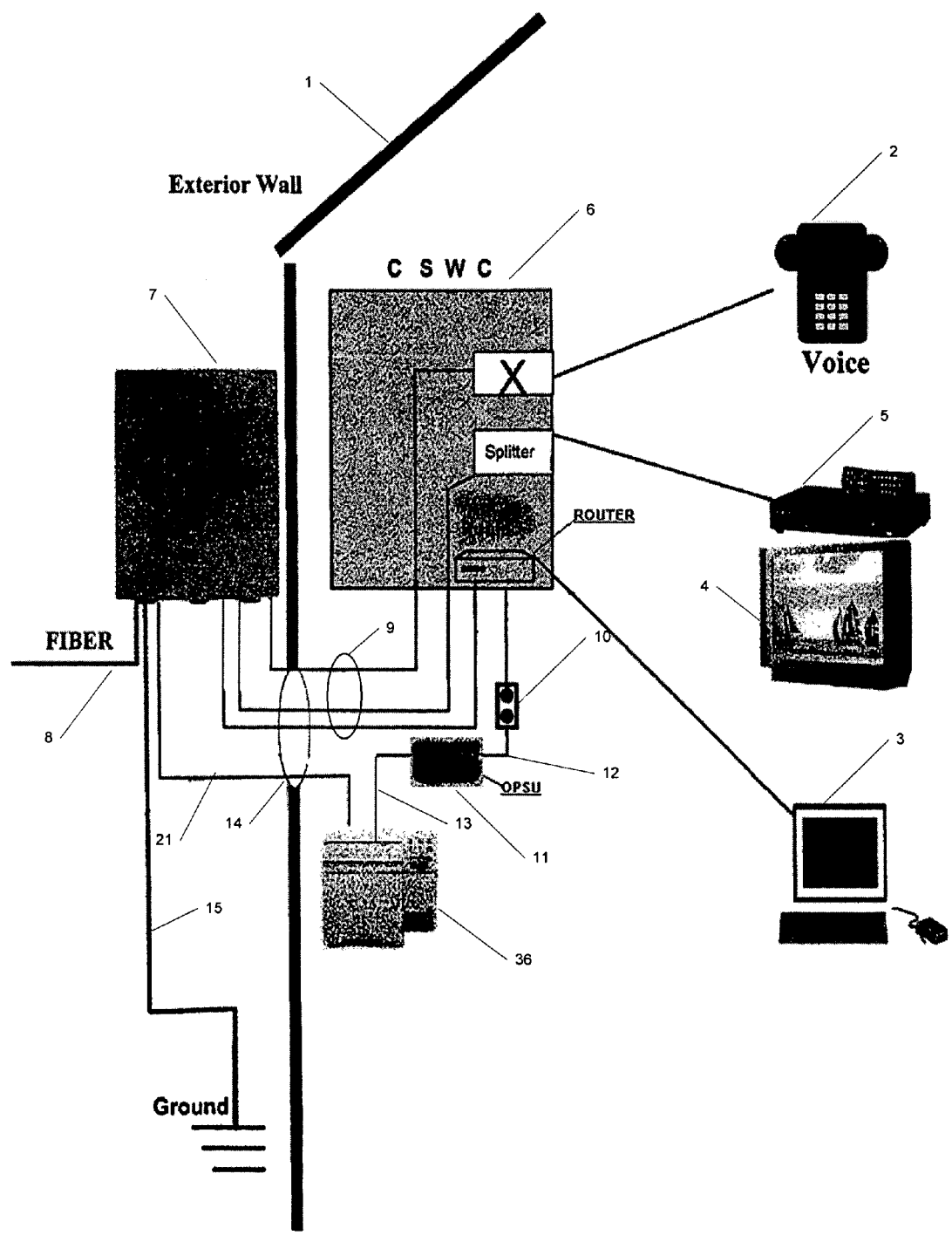
FIG. 3 illustrates a second implementation of an ONT powering system, according to the present invention.

FIG. 3 shows another implementation of a system according to the present invention. In contrast to the system shown in FIG. 1, the system in FIG. 3 places a BBU 36 in series between OPSU 11 and an ONT unit 37. BBU 36 may be different from BBU 16 in that it is configured to receive a power input from OPSU 11 (which, in this example, is a 48 VDC source), and provide a main power supply to the ONT unit 7 over cable 21. In normal operation, BBU 36 will act as a pass-through, allowing the power provided from OPSU 11 to flow to ONT unit 7 (while using a portion thereof to maintain a charge level on its internal battery). If a power outage occurs, BBU 36 then provides power from its battery backup to the ONT unit 7. BBU 36 may include facilities to detect such a loss of main power.

In an additional alteration to the embodiment shown in FIG. 3, BBU 36 may include a power conversion facility to transform the power supply from the OPSU 11 (in this example, 48VDC) to a lower-voltage power form, such as 12VDC. The lower voltage power is then provided to the ONT unit 7. ONT unit 7 in this case is configured to operate using the lower voltage power instead of the power supplied by the OPSU 11.

By including the BBU in series between the ONT unit 7 and the OPSU 11, additional distances may be achieved between the power outlet 10 and the ONT unit 7. For example, where the cable 21 can be a long as 50 feet, a maximum wire distance of 158 feet (50 feet for cable 21, 100 feet for cable 13 and 8 feet for cable 12) may be accommodated.

While the present invention(s) has been disclosed through reference to various exemplary and preferred embodiments thereof, those of ordinary skill in the art will understand that various changes may be made in the form and details described herein without departing from the spirit and scope of the invention(s), the scope of which is/are defined by the claims appended hereto. Those of ordinary skill in the art will recognize or be able to ascertain many equivalents to the exemplary embodiments described herein. Such equivalents are intended to be encompassed by the scope of this disclosure and the appended claims.

What is claimed is:

1. A system, comprising:
an optical network terminal unit including an optical network connection terminal, at least one communication terminal, and at least one power terminal; and
a power supply unit located remotely from the optical network terminal unit and coupled to the optical network terminal unit via a first cable and a power source via a second cable, the power supply unit including a power transformation facility to convert a first power form from the power source to a second power form different than the first power form, wherein the first and second power forms are one of alternating current and direct current;
wherein the first cable includes wiring that is no larger than approximately 24 gauge, and wherein the optical network terminal unit receives the second power form from the power supply unit over the first cable.

2. A system, comprising:
an optical network terminal unit including an optical network connection terminal, at least one communication terminal, and at least one power terminal;
a battery backup unit located remotely from the optical network terminal unit and coupled to the optical network terminal unit via a first cable, the first cable connected to the at least one power terminal, the battery backup unit including a battery; and
a power supply unit located remotely from the optical network terminal unit and the battery backup unit, coupled to the battery backup unit via a second cable and a power source via a third cable, the power supply unit including a power transformation facility to convert a first power form from the power source to a second power form different than the first power form, the power transformation facility coupled to the second cable to allow the second power form to flow to the battery backup unit, wherein the first and second power forms are one of alternating current and direct current;
wherein the battery backup unit provides the second power form to the optical network terminal unit over the first cable, and wherein the second cable includes wiring that is no larger than approximately 24 gauge.

3. The system according to claim 1, wherein the second cable includes an unused pair of at least one of data and telephone communication wires.

4. The system according to claim 1, further comprising a bi-directional third cable and a battery backup unit coupled to the optical network terminal unit via the third cable.

5. The system according to claim 4, wherein the bi-directional third cable is configured to provide backup power to the optical network terminal unit and to charge a backup battery.

6. The system according to claim 5, wherein the bi-directional third cable is further configured to provide diagnostic signals from the battery backup unit.

7. The system according to claim 1, wherein the distance between the power source and the optical network terminal unit exceeds approximately 100 feet.

8. The system according to claim 2, wherein one of the first and the second cable includes an unused pair of at least one of data and telephone communication wires.

9. The system according to claim 2, wherein the distance between the power source and the optical network terminal unit exceeds approximately 150 feet.

10. The system according to claim 2, wherein the first cable is bi-directional to provide diagnostic signals from the battery backup unit.

11. A system, comprising:
an optical network terminal unit disposed outside of a customer premises;
a power supply unit located within the customer premises and coupled to the optical network terminal unit via a first cable and a power source via a second cable, the power supply unit including a power transformation facility to convert a first power form from the power source to a second power form different than the first power form, wherein the first and second power forms are one of alternating current and direct current;
a bi-directional third cable; and
a battery backup unit coupled to the optical network terminal unit via the third cable;
wherein the optical network terminal unit receives the second power form from the power supply unit over the first cable and further wherein the first cable includes wiring that is no larger than approximately 24 gauge.

12. The system according to claim 11, wherein the second cable includes an unused pair of at least one of data and telephone communication wires.

13. The system according to claim 11, wherein the bi-directional third cable is configured to provide backup power to the optical network terminal unit and to charge a backup battery.

14. The system according to claim 13, wherein the bi-directional third cable is further configured to provide diagnostic signals from the battery backup unit.

15. The system according to claim 11, wherein the distance between the power source and the optical network terminal unit exceeds approximately 100 feet.

16. A system, comprising:
an optical network terminal unit including an optical network connection terminal, at least one communication terminal, and at least one power terminal;
a power supply unit located remotely from the optical network terminal unit;
a first cable configured to couple the power supply unit to the optical network terminal unit, wherein the first cable includes wiring that is no larger than approximately 24 gauge; and
a second cable configured to couple the power supply unit to a power source, wherein the power supply unit includes a power transformation facility configured to convert a first power form from the power source to a second power form different than the first power form, the first and second power forms being one of alternating current and direct current, and the optical network terminal unit receiving the second power form from the power supply unit over the first cable.

\* \* \* \* \*